Sept. 21, 1948.                C. EISEN                 2,449,889
              FLUID PRESS MOTOR AND CONTROL VALVE THEREFOR
Filed July 25, 1944                              2 Sheets-Sheet 1

INVENTOR.
CARL EISEN.
BY
Peter M. Boesen
ATTORNEY.

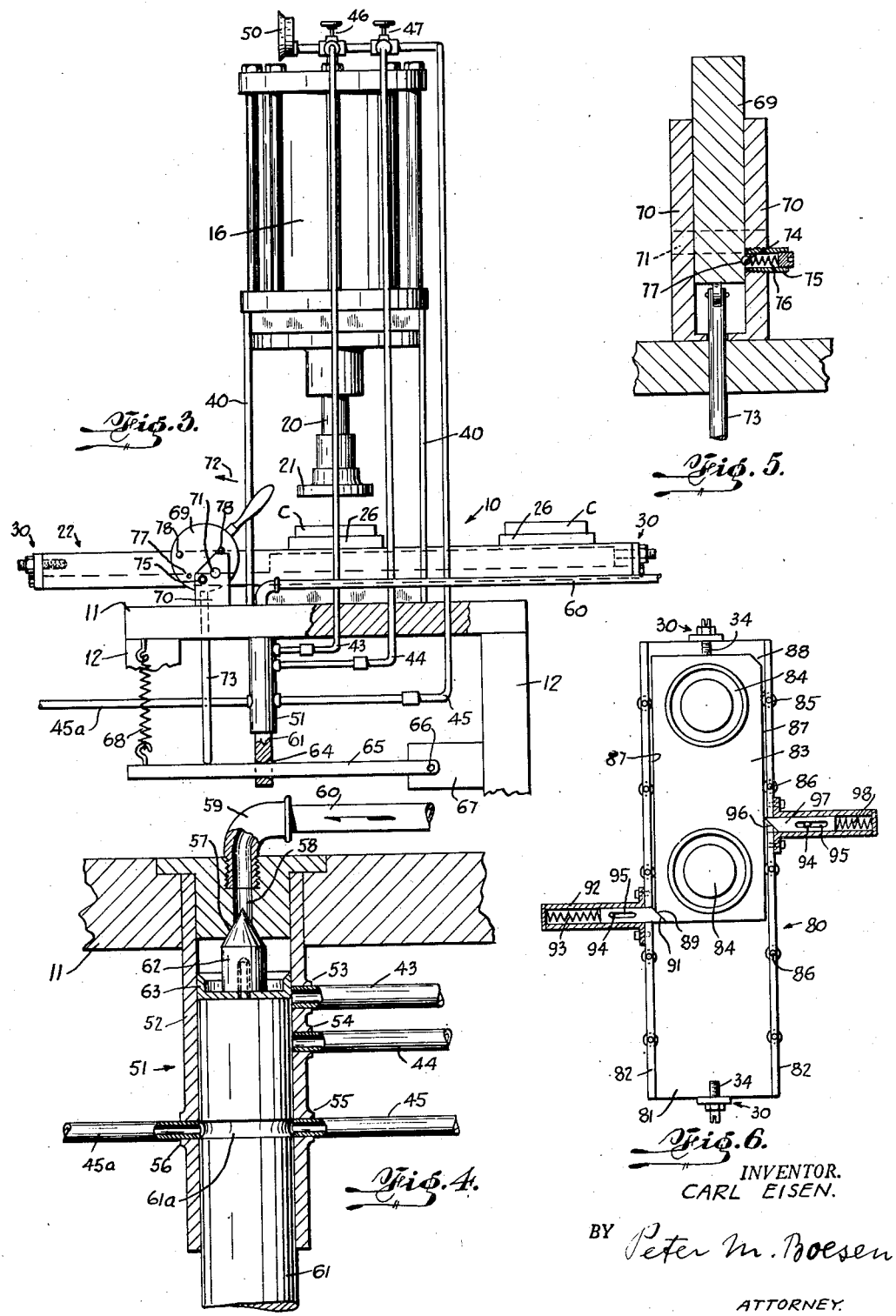

Patented Sept. 21, 1948

2,449,889

UNITED STATES PATENT OFFICE 2,449,889

FLUID PRESS MOTOR AND CONTROL VALVE THEREFOR

Carl Eisen, Bronx, N. Y.

Application July 25, 1944, Serial No. 546,556

1 Claim. (Cl. 121—38)

This invention relates to new and useful improvements in machines, such as powder presses, utilized in connection with powdered materials, such as face powder, or the like.

Heretofore, it has been difficult to compress powder into cake form without scattering some of the powder at the time of the impact of the die with said powder.

It is thus one purpose of this invention to remedy this fault, and at the same time speed up the production of caking powder, and more especially face powder, into compacts.

It is a further object in this connection to provide a machine which is simple in operation and economical of construction.

It is a still further object of this invention in caking facial powder to, first, bring down the compressor head of the machine slowly upon the surface of the powder, and, then, after contact has been made, suddenly exerting an additional pressure upon said compressor head, which makes it possible to cake the powder without any spill.

It is another object of the invention to provide a machine, as set forth, with means whereby said machine can be operated by two persons, one on each side of the machine, thus further speeding up the production.

In the drawings, wherein similar reference characters indicate corresponding parts:

Figure 3 is a right hand end view of the invention, as shown in Figure 1, with parts broken off.

Figure 4 is an enlarged sectional view of the air pressure and release control valve.

Figure 5 is an enlarged sectional view of the eccentric valve control handle.

Figure 6 is a top plan view of a modified form of the compact carrier.

Figure 2:
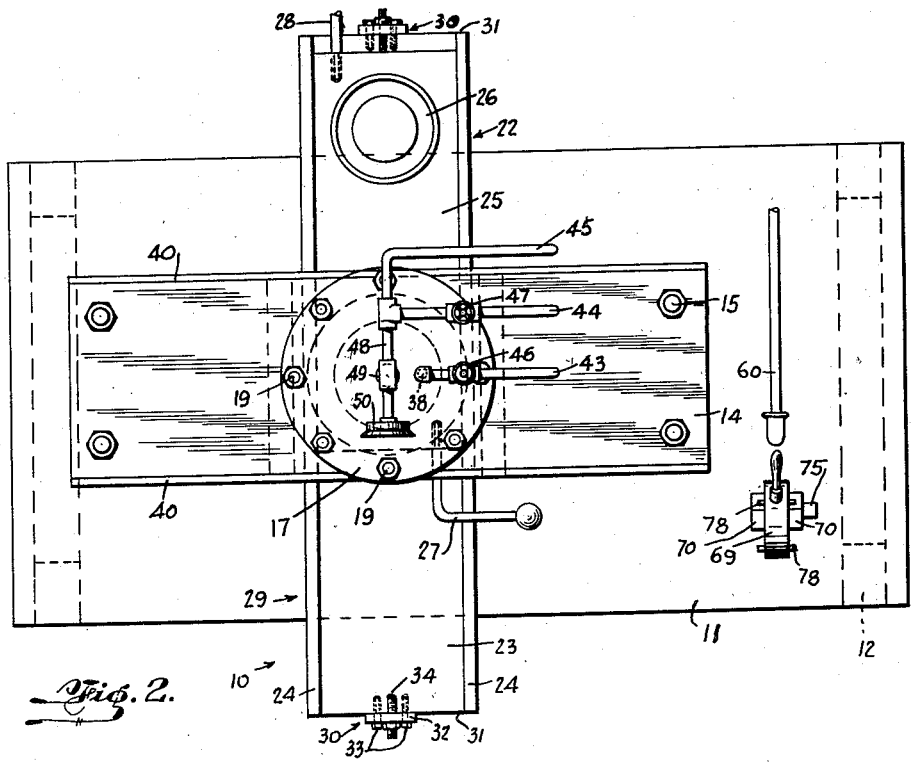
Figure 2 is a top plan view of Figure 1.

Referring more particularly to the drawings, the machine 10 consists of the table 11 having the legs 12; two steel plates 13 and 14 are spacedly secured to the table 11, and are separated by the bolts 15. A conventional pressure cylinder 16 is secured to the upper plate 14; the cylinder 16 is provided with the upper and lower heads 17 and 18 attached in their respective positions by means of bolts 19. A plunger 20 extends from the cylinder 16, which has the conventional piston and spring (not shown).

The end of the plunger 20 is provided with a die-head 21.

Figure 1:
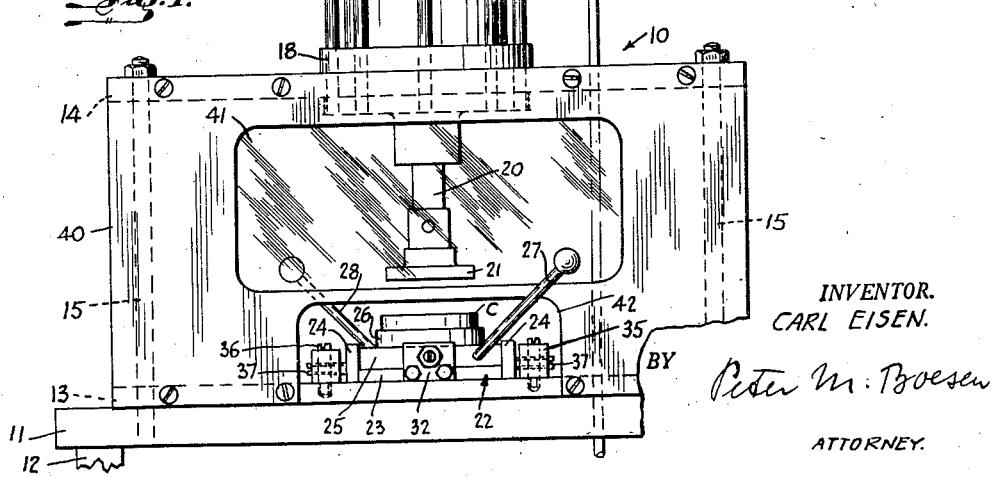
Figure 1 is a front elevation, with parts broken off, showing a powder compression device, constructed in conformity with my invention.

A carrier 22 for holding the compacts C (Figures 1 and 3) is mounted on the plate 13, said carrier consisting of the lower plate 23, two guide rails 24 and a sliding member 25.

The sliding member 25 has secured thereto two compact holders 26. The member 25 is pushed back and forth by means of handles 27 and 28.

As it is essential to accurately control the extreme positions of the member 25 in order to assure alignment with the die-head 21, adjusting means 30 are provided for at the two extreme ends 31 of the carrier 22. The adjusting means 30 consists of plates 32, each of which is secured by bolts 33 to the lower plate 23; a threaded bolt 34 is inserted through the plates 32 and can be adjusted, thus accurately stopping the extreme movement of the member 25. The carrier 22 is secured to the plate 13 by means of two rail members 35, which are attached to said plate 13 by means of a plurality of vertical screws, or bolts 36.

The horizontal screws or bolts 37 are provided to adjustably secure the guide rails 24 of the carrier 22 in proper alignment with the die-head 21.

The operating mechanism is preferably protected from contact with the operator's hands by two shields 40, which have the windows 41 and the cut-out 42 for the passage of the slide carrier 22. Three pipe lines 43, 44 and 45 are secured to the cylinder head 17. Pipe line 44 leads from the cylinder head 17 and is provided with a shut-off valve 47, and is also connected to the pipe 48 leading to the cylinder head 17, as shown at 49. The free end of the pipe line 48 is provided with a pressure gage 50, while the opposite end terminates in the exhaust pipe line 45. These pipe lines pass downward through the table 11 and connect with an air pressure- and release control valve 51. The latter consists of a sleeve 52 having therein port openings 53, 54, 55 and 56. The upper end of the sleeve 52 is provided with a needle valve seat 57, which terminates in the opening 58, the L 59, and the pipe line 60. A piston 61 is slidably mounted within the sleeve 52, having at its upper end the needle valve 62 in engagement with the needle valve seat 57; a conventional gasket 63 is provided to secure a tight fit. The lower end of the piston 61 is provided with an opening 64 through which passes the longitudinal or horizontal rod 65, fulcrumed at 66 by means of a bracket 67 secured to one of the table legs 12.

The opposite end of the horizontal arm 65 is connected to the table 11 by means of a spring 68. It will be seen that by means of this arrangement the piston 61 is normally kept in its uppermost position, as shown in Figure 4, thus closing the needle valve 62. An eccentric handle 69 is mounted between two side members 70 at 71. Moving the eccentric lever 69 in the direction of the arrow 72 will cause a rod 73 to press downward against the horizontal lever 65, thus pulling the piston 61 downward into its first position, which permits the air from the pipe line 60 to flow into the pipe line 43, the latter connects with the needle valve 46, as previously described, thus causing a slow flow of air from the pipe line 60 which in turn will result in a slow downward movement of the piston rod 20. The movement of the eccentric handle 69 to this first position is controlled by means of a ball 74 within the housing 75 and held in extended position by means of a spring 76, this ball 74 will snap into the hollow space 77 of the handle 69. A further movement in the direction of the arrow 72 of the handle 69 will bring the piston 61 down below the opening of the pipe 44, and will, since the valve 47 is completely open, permit an instantaneous rush of air from the air line 60 into the cylinder 16 (by-passing the needle valve 46), thus giving the piston rod a sudden impact equal to the amount of pressure in the air line 60. Upon returning the handle 69 to its shut position, shown in Figure 3, the piston 61 will again move upward to a position shown in Figure 4, thus permitting the compressed air in the cylinder 16 to escape through the exhaust pipe line 45 by passing along the groove 61a of the piston 61 into the exhaust line 45a. The pressure in the cylinder 16 having thus been released, a spring pressing against the piston head within the cylinder (not shown) will force the piston rod 20 into its upper position, thus releasing the compact C, permitting the member 25 to be moved into its other extreme position, and thus placing the next compact with loose powder into a position ready for the compression. Pins 78 on the eccentric handle 69 control the two extreme movements of the said handle.

In the modification shown in Figure 6, the slide carrier 80 consists of the lower member 81, slide rails 82, slide members 83 with compact holders 84. The slide member 83 slides between the rollers 85 which latter are secured to the side rails 82 by means of pins 86. A sufficient number of rollers 85 are provided on each side to assure a contact of at least three rollers with each edge 87 of the slide member 83. To obtain the extended positions of the slide member 83 within the slide 80, said slide member 83 is provided with bevelled corners 88 and 89, as illustrated in Figure 6; the bevelled surface 89 of the slide member 83, is in contact with the bevelled surface 91 of a latch member 90. The latch 91 slidably moves within the housing 92 and is held in extended position by the spring 93. A pin 94 within the slot 95 controls the movement of the latch member 91. When the slide member 83 is pushed towards the other end of the slide 80 the bevelled surface 89 will cause the latch 91 to move inward in the housing 92, thus permitting a free movement of the slide member 83 into its extreme opposite position. As soon as the said opposite position has been approximately reached, the bevelled edge 96 of the latch member 91 will engage the bevelled surface 88 on account of the pressure of the spring 93. If the slide member 83 should not have been moved into its extreme position by the operator the pressure of the bevelled edge 96 against the bevelled surface 88 will cause the slide member 83 to reach its maximum position controlled by the screw 34 of the adjustable stop member 30.

The operation of the device is as follows:

The operators having placed two compacts C with the proper amount of loose powder therein, in the holders 26 of the slide member 25, the handle 69 is now turned by the operators in the direction of the arrow 72 (Figure 3) into its first position, controlled by the ball member 74, as previously described. Air from the air line 60 will now enter through the opened needle valve 62 into the preliminary air line 43 which connects with a needle valve 46 adjusted for a slow flow of air into the cylinder 16 through the pipe nipple 38. The piston rod 20 with the die-head 21 will thus slowly move downward against the compact C, giving the loose powder an initial straightening out contact. Upon said contact of the die-head 21 with the surface of the powder, the handle 69 is further moved in the direction of the arrow 72 into its extreme opposite position, thus causing the piston 61 by means of the push rod 73 to move into its lowermost position and thereby opening the air line 44. The full pressure of air from the pipe line 60 now by-passing the pipe line 43 with the needle valve 46, will rush through pipe line 44. The full pressure of air now being suddenly exerted within the cylinder 16, will cause the piston (not shown) to exert a sudden impact pressure of the die-head 21 upon the surface of the powder within the compact C, compressing said powder into the desired caked form. The handle 69 is now returned into the position illustrated in Figure 3, thus causing the piston 61 to return into the closed position of the needle valve 62, as shown in Figure 4. The compressed air from the cylinder 16 is now escaping through the exhaust pipe 45 passing around the groove 61a of the piston 61 into the exhaust line 45a. This exhaust line 45a preferably leads out into the open and away from any disturbing effect it may have upon any loose powder.

While the above description refers to air pressure throughout, it is understood that other means may be substituted, such as oil, etc., in which case, of course, conventional changes will have to be made in the apparatus, as shown.

It is also understood that the die-head 21, and the compact carriers 26 and 84 are interchangeable to accommodate a plurality of sizes of compacts.

It is still further understood that while only one cylinder 16 has been shown in this embodiment of the invention, that it is possible to mount more than one cylinder controlled by the same operating means, the number of such cylinders being only limited by the capacity of the operators operating such machines.

It is obvious that changes may be made in the form, construction and arrangement of the several parts, as shown, within the scope of the appended claim, without departing from the spirit of the invention, and I do not, therefore, wish to limit myself to the exact construction and arrangement shown and described herein.

What I claim as new, and desire to secure by Letters Patent of the United States, is:

A fluid press system, including a main expansible cylinder means for converting fluid pressure into mechanical pressure, a unitary source of fluid pressure, and a control valve system for securing two rates of expansion of said cylinder means, said valve system including a single secondary expansible transfer chamber, mechanical means for altering the effective longitudinal dimension thereof, valve means for admitting fluid from said unitary source to one end of said chamber, a plurality of cylinder feed pipes opening into said chamber sequentially and additively, as said chamber is expanded, the pipe first opening thereinto having a constricted portion, whereby fluid flow therethrough to said cylinder means takes place at a relatively reduced rate, thereby producing a relatively reduced rate of expansion of said cylinder means, and at least one other pipe opening later, but while said first pipe is still opened, into said chamber affording substantially unrestricted fluid flow to said cylinder means, means for determining the degree of expansion of said transfer chamber, and an exhaust pipe for exhausting fluid from said cylinder means, leading to said valve, said valve system also including means for porting said exhaust pipe to the atmosphere and means for operating said porting means simultaneously with the reduction of the longitudinal dimension of said transfer chamber to a minimum.

CARL EISEN.

REFERENCES CITED

The following references are of record in the file of this patent:

UNITED STATES PATENTS

| Number | Name | Date |
|---|---|---|
| 1,244,096 | Kendall | Oct. 23, 1917 |
| 1,399,169 | Trace | Dec. 6, 1921 |
| 1,428,688 | Fritts | Sept. 12, 1922 |
| 1,445,127 | Buckman | Feb. 13, 1923 |
| 1,641,131 | Baker | Aug. 30, 1927 |
| 1,655,815 | Johanson | Jan. 10, 1928 |
| 1,799,366 | Heinkel | Apr. 7, 1931 |
| 1,805,056 | Taylor | May 12, 1931 |
| 1,877,102 | Whitesell | Sept. 13, 1932 |
| 1,904,112 | Achard | Apr. 18, 1933 |
| 1,920,596 | Schafer | Aug. 1, 1933 |
| 2,067,492 | Kingsbury | Jan. 12, 1937 |
| 2,098,425 | Landenberger | Nov. 9, 1937 |
| 2,138,047 | Turner | Nov. 29, 1938 |
| 2,259,576 | MacMillin | Oct. 21, 1941 |
| 2,270,767 | Platz | Jan. 20, 1942 |
| 2,351,058 | Marks | June 13, 1944 |